(12) United States Patent
Scott et al.

(10) Patent No.: US 12,548,014 B2
(45) Date of Patent: Feb. 10, 2026

(54) SHAREABLE AND NESTED TRANSACTIONS ON HASH CHAINS

(71) Applicant: Intuit Inc., Mountain View, CA (US)

(72) Inventors: Glenn Carter Scott, Los Altos Hills, CA (US); Michael Richard Gabriel, Milpitas, CA (US)

(73) Assignee: Intuit Inc., Mountain View, CA (US)

( * ) Notice: Subject to any disclaimer, the term of this patent is extended or adjusted under 35 U.S.C. 154(b) by 121 days.

(21) Appl. No.: 18/583,830

(22) Filed: Feb. 21, 2024

(65) Prior Publication Data

US 2024/0193588 A1   Jun. 13, 2024

Related U.S. Application Data

(62) Division of application No. 16/710,639, filed on Dec. 11, 2019, now Pat. No. 11,941,611.

(51) Int. Cl.
*G06Q 20/36* (2012.01)
*H04L 9/06* (2006.01)

(52) U.S. Cl.
CPC ..... *G06Q 20/3676* (2013.01); *G06Q 20/3678* (2013.01); *H04L 9/0637* (2013.01); *H04L 9/0643* (2013.01)

(58) Field of Classification Search
CPC ............ G06Q 20/3676; G06Q 20/3678; H04L 9/0637; H04L 9/0643; H04L 9/50; H04L 9/3239; H04L 2209/56
See application file for complete search history.

(56) References Cited

U.S. PATENT DOCUMENTS

| 10,185,595 | B1 | 1/2019 | Ramatchandirane |
|---|---|---|---|
| 2012/0262815 | A1* | 10/2012 | Sundrani ............... G11B 20/18 |
| 2015/0193265 | A1 | 7/2015 | Riegel |
| 2016/0044081 | A1 | 2/2016 | Pingenot |

(Continued)

FOREIGN PATENT DOCUMENTS

| CN | 108984645 A | * 12/2018 | ............. G06Q 40/04 |
|---|---|---|---|
| CN | 109102284 A | * 12/2018 | ........... G06Q 20/382 |

(Continued)

OTHER PUBLICATIONS

Nam-Young Lee, Modifiable Public Blockchains Using Truncated Hashing and Sidechains, Nov. 2019, IEEE, https://ieeexplore.ieee.org/stamp/stamp.jsp?tp=&arnumber=8917564 (Year: 2019).*

*Primary Examiner* — Chunling Ding
(74) *Attorney, Agent, or Firm* — Lathrop GPM LLP

(57) ABSTRACT

A method for using shareable and nested transactions on hash chains includes appending a data block of a transaction of a first hash chain to a second hash chain. The second hash chain originates from a tail block of the first hash chain. The method further includes removing the data block from the transaction by setting a tail block identifier of the second hash chain to a previous block appended to one of the first hash chain and the second hash chain prior to the data block. The method further includes updating the transaction with updated transaction data by setting the tail block identifier of the second hash chain to the updated data block. The method further includes appending the second hash chain to the first hash chain by setting the tail block of the first hash chain to the tail block of the second hash chain.

20 Claims, 7 Drawing Sheets

(56) References Cited

U.S. PATENT DOCUMENTS

| | | | |
|---|---|---|---|
| 2016/0292213 A1 | 10/2016 | Stanfill | |
| 2016/0328796 A1 | 11/2016 | Acuna-Rohter | |
| 2017/0134375 A1 | 5/2017 | Wagner | |
| 2017/0153847 A1* | 6/2017 | Harari | G06F 3/0644 |
| 2017/0295023 A1 | 10/2017 | Madhavan | |
| 2018/0165760 A1 | 6/2018 | Xie | |
| 2018/0300741 A1* | 10/2018 | Leonard | G06Q 30/08 |
| 2018/0323963 A1* | 11/2018 | Stollman | H04L 9/3239 |
| 2019/0377491 A1* | 12/2019 | Hallak | G06F 3/061 |
| 2020/0134066 A1* | 4/2020 | Yegorin | H04L 9/0637 |
| 2020/0177386 A1 | 6/2020 | Mahmood | |
| 2020/0193363 A1 | 6/2020 | Jones | |
| 2020/0344132 A1* | 10/2020 | Padmanabhan | H04L 9/0637 |
| 2020/0371913 A1 | 11/2020 | Dunham | |
| 2020/0394651 A1 | 12/2020 | Kreder | |
| 2022/0029792 A1 | 1/2022 | Patel | |
| 2025/0124510 A1* | 4/2025 | Wood | G06Q 40/04 |

FOREIGN PATENT DOCUMENTS

| | | | | |
|---|---|---|---|---|
| CN | 109828847 A | | 5/2019 | |
| WO | WO-2018214898 A1 * | | 11/2018 | G06F 16/2379 |
| WO | WO-2019024780 A1 * | | 2/2019 | H04L 67/5682 |

* cited by examiner

SHAREABLE AND NESTED TRANSACTIONS ON HASH CHAINS

CROSS-REFERENCE TO RELATED APPLICATIONS

This application is a divisional of application Ser. No. 16/710,639, filed Dec. 11, 2019.

BACKGROUND

Hash chains may be used to store data using immutable blocks. A transaction may be stored to a hash chain as a set of multiple blocks that is treated as one atomic update to a hash chain. A challenge is to provide access to the hash chain while the blocks of a transaction are written to the hash chain.

SUMMARY

In general, in one aspect, one or more embodiments relate to a method that includes appending a data block of a transaction of a first hash chain to a second hash chain. The second hash chain originates from a tail block of the first hash chain. The method further includes removing the data block from the transaction. Invalidation of the first hash chain is avoided by setting a tail block identifier of the second hash chain to a previous block appended to one of the first hash chain and the second hash chain prior to the data block. The method further includes updating the transaction with updated transaction data by appending an updated data block to the second hash chain after removing the data block. Appending the updated data block includes setting the tail block identifier of the second hash chain to the updated data block. The method further includes appending the second hash chain to the first hash chain by setting the tail block of the first hash chain to the tail block of the second hash chain.

In general, in one aspect, one or more embodiments relate to a system that includes a computer processor and a memory coupled to the computer processor. The memory includes an application. The application executes on the computer processor and is configured for appending a data block of a transaction of a first hash chain to a second hash chain. The second hash chain originates from a tail block of the first hash chain. The application is further configured for removing the data block from the transaction without invalidating the hash chain. Removing the data block from the transaction further includes setting a tail block identifier of the second hash chain to a previous block appended to one of the first hash chain and the second hash chain prior to the data block. The application is further configured for updating the transaction with updated transaction data by appending an updated data block to the second hash chain after removing the data block. Appending the updated data block further includes setting the tail block identifier of the second hash chain to the updated data block. The application is further configured for appending the second hash chain to the first hash chain by setting the tail block of the first hash chain to the tail block of the second hash chain.

In general, in one aspect, one or more embodiments relate to a non-transitory computer readable medium including a computer-readable program code for a method that includes appending a data block of a transaction of a first hash chain to a second hash chain. The second hash chain originates from a tail block of the first hash chain. The method further includes removing the data block from the transaction. Invalidation of the first hash chain is avoided by setting a tail block identifier of the second hash chain to a previous block appended to one of the first hash chain and the second hash chain prior to the data block. The method further includes updating the transaction with updated transaction data by appending an updated data block to the second hash chain after removing the data block. Appending the updated data block includes setting the tail block identifier of the second hash chain to the updated data block. The method further includes appending the second hash chain to the first hash chain by setting the tail block of the first hash chain to the tail block of the second hash chain.

Other aspects of the invention will be apparent from the following description and the appended claims.

DETAILED DESCRIPTION

Figure 1A:
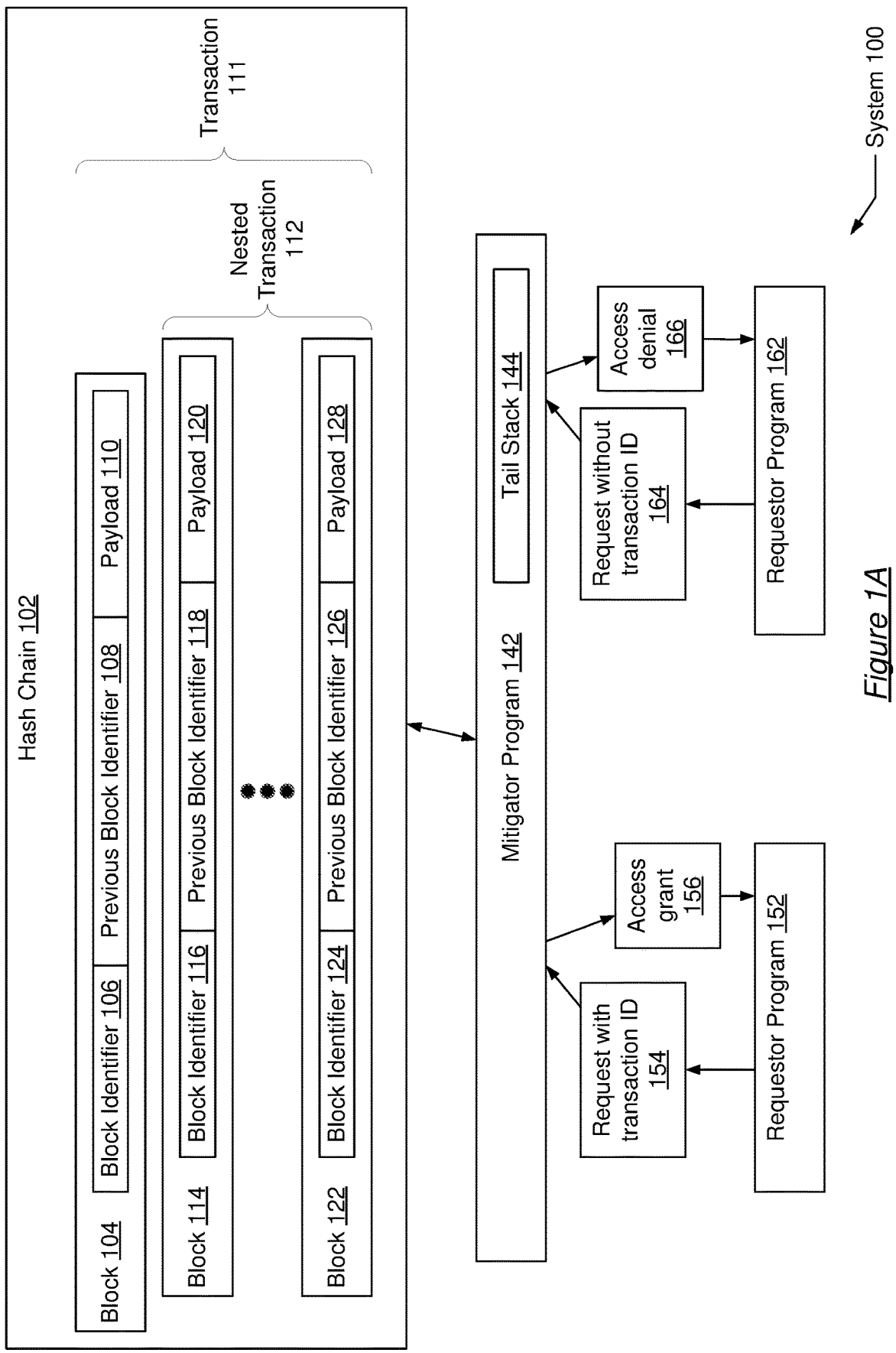
FIG. 1A and FIG. 1B show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, a transaction may be atomic and include a set of blocks that are stored to a hash chain by appending the blocks to the hash chain. The blocks include data blocks with the data from the transaction that is being stored. The initial block of a transaction may be a lock block that locks the hash chain from being written to or read by other processes. Read access to the data blocks of a transaction is denied for requests from entities that are not participating in the transaction. The end block of a transaction stored on a hash chain may be an unlock block that unlocks the hash chain so that other processes may read the hash chain (including the newly stored transaction) and may write additional transactions to the hash chain. Additionally, a "revert" ability may discard the data blocks of a transaction prior to finalizing the transaction on the hash chain.

Figure 1B:
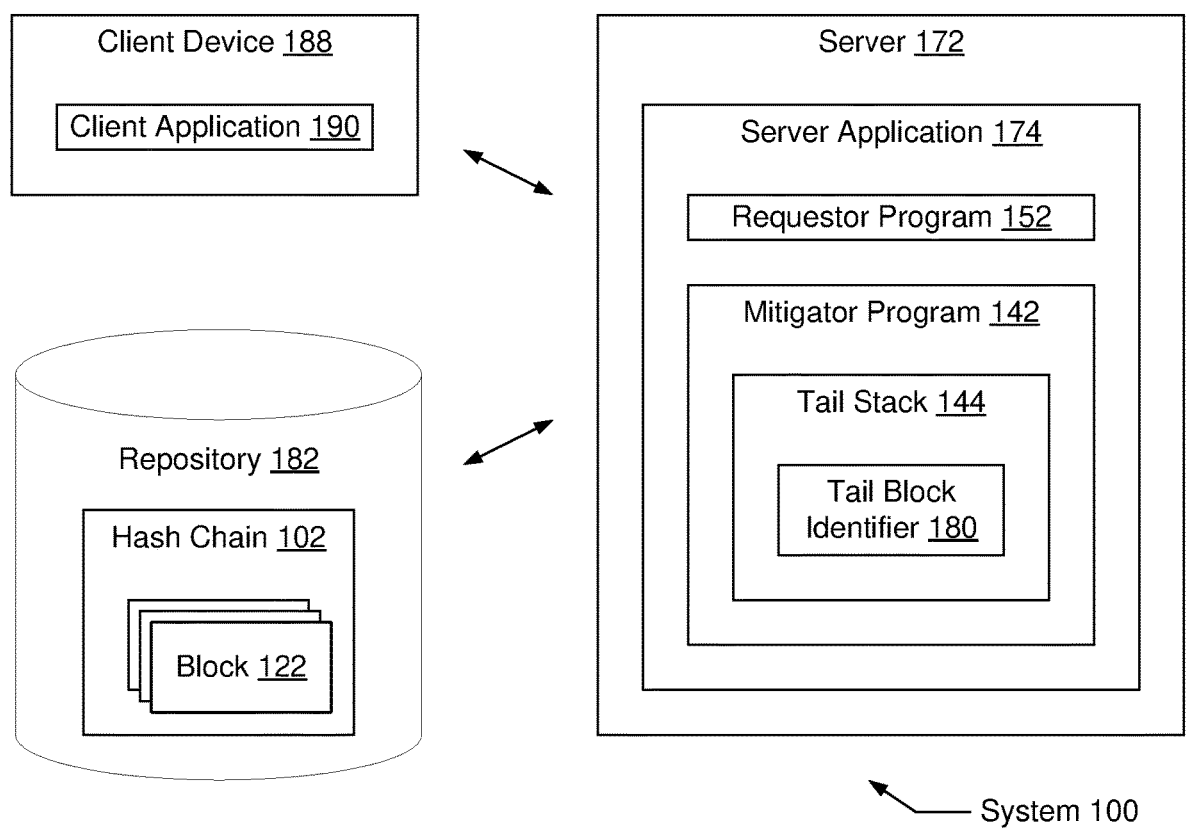

FIG. 1A and FIG. 1B show diagrams of embodiments in accordance with the disclosure that share and nest transactions on hash chains. The embodiments of FIGS. 1A and 1B may be combined and may include or be included within the features and embodiments described in the other figures of the application. The features and elements of FIGS. 1A and 1B are, individually and as a combination, improvements to technology that includes hash chain computing systems. The various elements, systems, and components shown in FIGS. 1A and 1B may be omitted, repeated, combined, and/or altered as shown from FIGS. 1A and 1B. Accordingly, the scope of the present disclosure should not be considered limited to the specific arrangements shown in FIGS. 1A and 1B.

Turning to FIG. 1A, the system (100) shares and nests transactions on hash chains. The system (100) includes the hash chain (102), the mitigator program (142), and the requester programs (152) and (162).

The mitigator program (142) mitigates access to the hash chain (102). The mitigator program (142) includes the tail stack (144). The tail stack (144) is a stack of tail block identifiers that may identify the tail blocks of nested and non-nested transactions recorded in the hash chain (102). For example, the hash chain (102) may include a first transaction (111) that includes the block (104) and includes the nested transaction (112). The tail stack (144) may include a first tail block identifier at the bottom of the stack that identifies the block (104) as the tail block of the first transaction (111) and a second tail block identifier at the top of the stack that identifies the block (122) as the tail block of the nested transaction (112).

The mitigator program (142) may grant or deny read access and write access to the hash chain (102) based on a transaction identifier that identifies the transaction to which the access is requested. The mitigator program (142) may grant read access to completed and unlocked transactions. The mitigator program (142) may deny read or write access to requests to transactions that have not been completed and are locked unless the request includes the identifier of the locked transaction.

The requester programs (152) and (162) access the hash chain (102) through the mitigator program (142) to read and write data and transactions to the hash chain (102). In doing so, the requester programs (152) and (162) send read and write requests to the mitigator program (142) and, in response, may receive access grants and denials based on transaction identifiers sent with the requests.

As an example, the requester program (152) sends the request (154) with the transaction identifier of the nested transaction (112) and, in response, receives the access grant (156) from the mitigator program (142). The access grant (156) may be a response to the request (154) identifying that the request (154) was successfully processed. When the request (154) is a read request, the access grant (156) may include the data from the hash chain that is responsive to the read request.

As another example, the requester program (162) sends the request (164) without the transaction identifier for the nested transaction (112) and, in response, receives the access denial (166). The access denial (166) may indicate to the requester program (162) that the request (164) was not completed.

The hash chain (102) includes the transaction (111), which includes the nested transaction (112). The transaction (111) includes the block (104). The nested transaction (112) includes the blocks (114) through (122). The block (114) may be a lock block that blocks access to the nested transaction (112) until an unlock block is written to the nested transaction (112). The block (122) may be an unlock block for the nested transaction (112) that restores access to the transaction (111).

In one or more embodiments, the hash chain (102) may include lock blocks and unlock blocks that identify which blocks belong to which transactions. The block (114) may be a lock block and the block (122) may be an unlock block for the nested transaction (112). Additionally, the block (104) may be a tail block identified in the tail stack (144) (shown in FIG. 1B) to identify an end of the transaction (111) and the block (122) may be another tail block identified in the tail stack (144) to identify an end of the nested transaction (112). If the nested transaction (112) were removed from the hash chain (102), then the block (122) would be removed from the tail stack (144).

The hash chain (102) is a data structure that stores transactions as sequences of immutable blocks. The hash chain (102) includes the blocks (104), (114), (122). The blocks (104), (114), (122) are immutable in that changing data within the blocks (104), (114), and (122) after the blocks (104), (114), (122) are stored in the hash chain (102) may invalidate the hash chain (102).

The blocks (104), (114), and (122) store the data within the hash chain (102). The blocks (104), (114), and (122) respectively include the block identifiers (106), (116), and (124); the previous block identifiers (108), (118), and (126); and the payloads (110), (120), and (128).

The block identifiers (106), (116), and (124) uniquely identify the blocks (104), (114), and (122) of the hash chain (102). The block identifiers (106), (116), and (124) may be generated with a cryptographic hash function from the previous block identifiers (108), (118), and (126); and the payloads (110), (120), and (128). For example, the block identifier (106) may be generated by applying a cryptographic hash function to the previous block identifier (108) and the payload (110).

The previous block identifiers (108), (118), and (126) respectively identify the blocks in the hash chain (102) that are immediately prior to the blocks (104), (114), and (122). The previous block identifiers (108), (118), and (126) may be the block identifiers of the identified blocks. For example, the previous block identifier (118) of the block (114) may identify the block (104) as the immediately prior block to the block (114) and the value of the previous block identifier (118) may be equivalent to the value of the block identifier (106).

The payloads (110), (120), and (128) include the data being stored in the hash chain. Data in the payloads (110), (120), and (128) may include timestamps, transaction amounts, metadata, etc.

Turning to FIG. 1B, the system (100) includes the server (172), the repository (182), and the client device (188). The server (172) includes the server application (174), which may include the requestor program (152) and the mitigator program (142).

The requestor program (152) is a program on the server (172). The requestor program (152) may send read requests and write requests for accessing the hash chain (102) to the mitigator program (142) using a representational state transfer application programming interface (RESTful API).

The mitigator program (142) is a program on the server (172). The mitigator program (142) may grant or deny access to the hash chain (102) in response to requests from requester programs, such as the requester program (152) and the requestor program (162) from FIG. 1A. The requestor program (162) of FIG. 1A may reside on a separate server and is not shown on FIG. 1B. The mitigator program (142) includes the tail stack (144).

The tail stack (144) includes the tail block identifier (180). The tail block identifier (180) may identify the block (122) as the tail block of the hash chain (102).

The server application (174) is a set of programs on the server (172) that may interact with the client application (190) of the client device (188) and the hash chain (102) of the repository (182). The server application (174) may be a website that presents data from the blocks of the hash chain (102) to the client application (190).

Figure 5A:
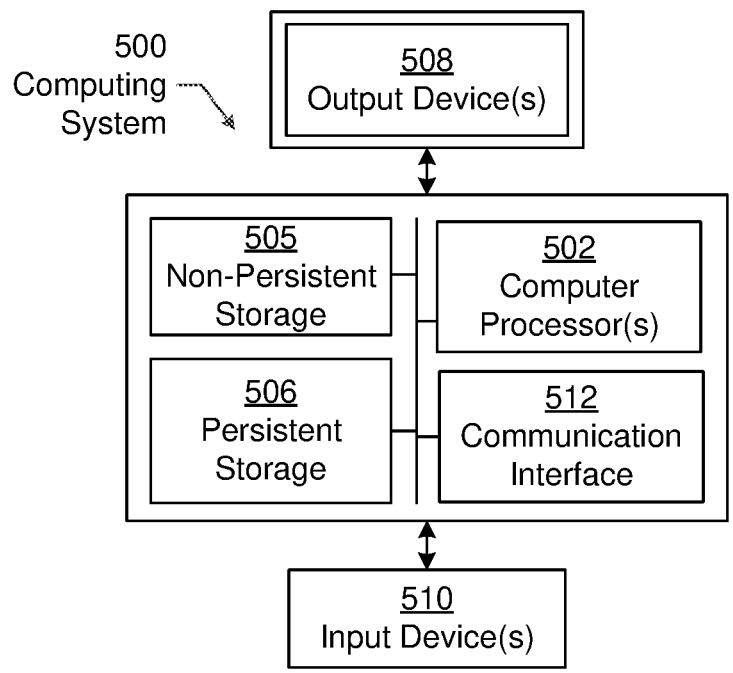
FIG. 5A and FIG. 5B show computing systems in accordance with disclosed embodiments.
Figure 5B:
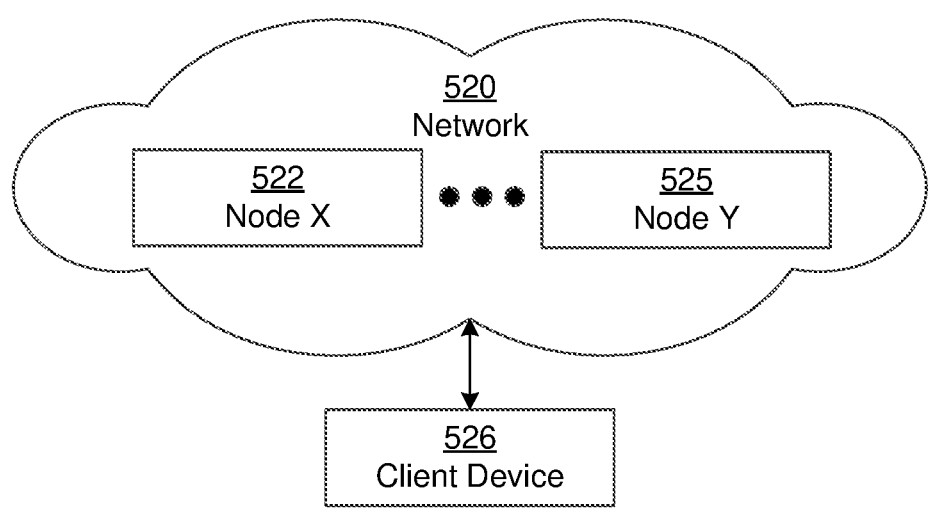

The server (172) is an embodiment of the computing system (500) and the nodes (522) and (524) of FIG. 5A and FIG. 5B. The server (172) may be one of a set of virtual machines hosted by a cloud services provider that deploys the server application (174) for a financial services provider.

The repository (182) is a computing system that may include multiple computing devices in accordance with the computing system (500) and the nodes (522) and (524) described below in FIGS. 5A and 5B. The repository (182) may be hosted by a cloud services provider for the financial services provider. The cloud services provider may provide hosting, virtualization, and data storage services as well as other cloud services. The financial services provider may operate and control the data, programs, and applications that store and retrieve data from hash chains in the repository (182). The data in the repository (182) may include data for multiple transactions for multiple customers of the financial services provider. The data in the repository (182) may be processed by programs executing on the server (172). The repository (182) may be hosted by the same cloud services provider as the server (222).

The client device (188) is an embodiment of the computing system (500) and the nodes (522) and (524) of FIG. 5A and FIG. 5B. The client device (188) includes the client application (190) for accessing the server application (174). The client application (190) may include a graphical user interface for interacting with the server application (174) to display transactions, data, metadata, etc. A user may operate the client application (190) to search for and select transactions, data, metadata, etc. The results of the search are then displayed by the client device (188) in the client application (190). The client device (188) may be operated by a customer of the financial services provider.

The client application (190) may be a web browser that accesses the server application (174) using web pages hosted by the server (172). The client application (190) may additionally be a web service that communicates with the server application (174) using a representational state transfer application programming interface (RESTful API). Although FIG. 1B shows a client server architecture, one or more parts of the server application (174) may be a local application on the client device (188) without departing from the scope of the disclosure.

Figure 2:
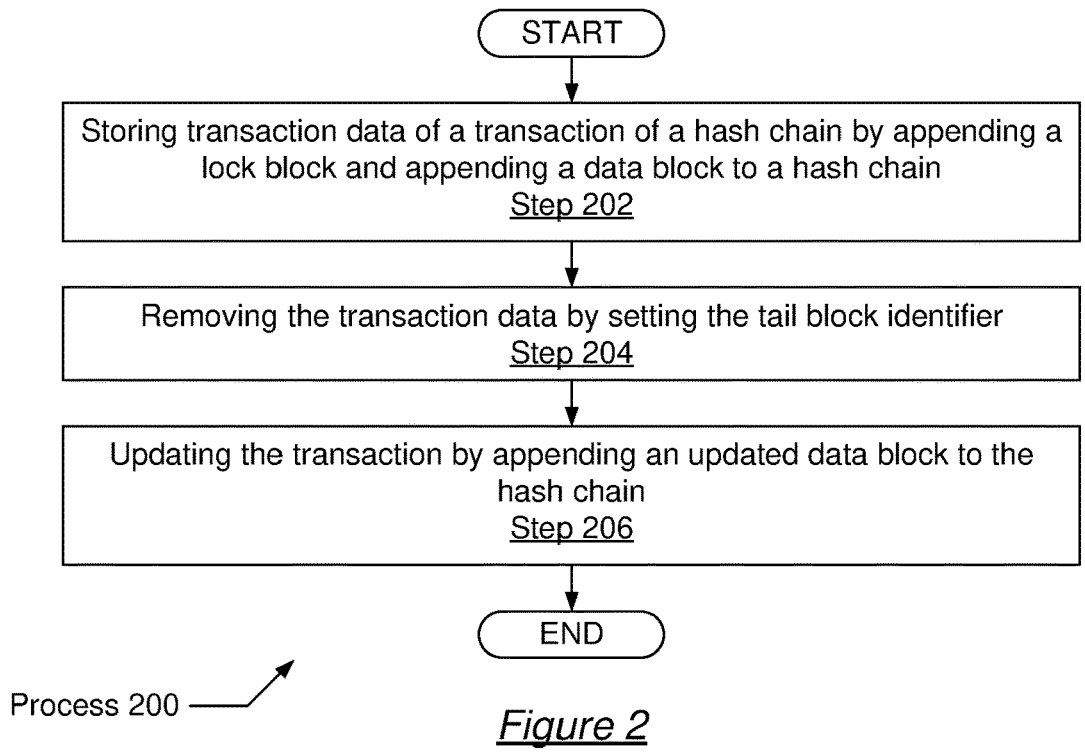
FIG. 2 and FIG. 3 show flowcharts in accordance with disclosed embodiments.
Figure 3:
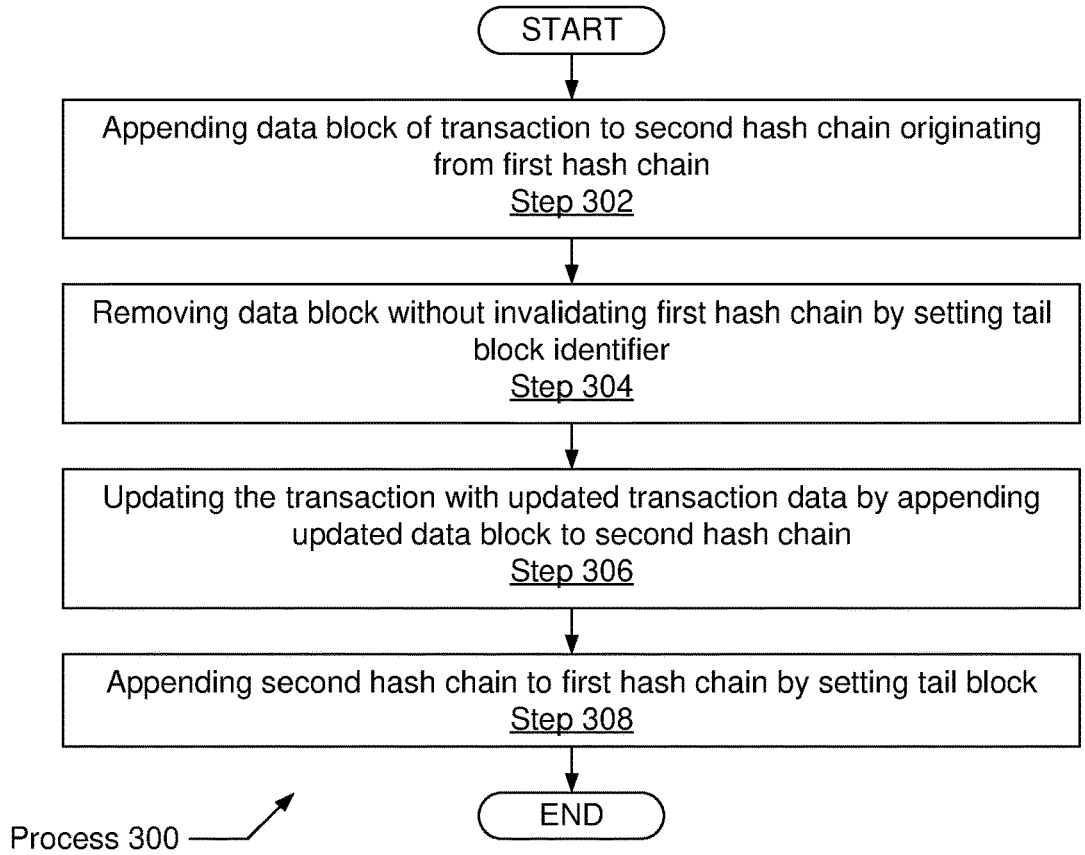

FIG. 2 and FIG. 3 show flowcharts of the process (200) for removing and updating data of a transaction being added to a hash chain by setting a tail block identifier and the process (300) for removing and updating data of a transaction of in second hash chain that is appended to a first hash chain in accordance with the disclosure. The embodiments of FIGS. 2 and 3 may be combined and may include or be included within the features and embodiments described in the other figures of the application. The features of FIGS. 2 and 3 are, individually and as an ordered combination, improvements to the technology of hash chain computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a computer processor process an instruction unless an interrupt is received to signify that condition exists. As another example, determinations may be performed by performing a test, such as checking a data value to test whether the value is consistent with the tested condition.

Turning to FIG. 2, the process (200) stores transactions to hash chains using blocks, lock blocks, and unlock blocks. In Step 202, transaction data of a transaction of a hash chain is stored by appending a lock block and appending a data block to a hash chain. Blocks may be appended to the hash chain by setting the previous block identifier of a new block to the tail block identifier of the hash chain, forming the payload of the block, and generating a block identifier for the new block by applying a cryptographic hash to the previous block identifier and the payload of the new block. The tail block identifier may be retrieved from the mitigator program that received the write request from the requester program. After generating the block identifier of the new block, the tail block identifier of the hash chain is updated to be the block identifier of the lock block.

The cryptographic hash function uses an algorithm that maps data of arbitrary size (which may be referred to as a "message") to a bit string of a fixed size (which may be referred to as a "hash value", "hash", or "message digest") and is a one-way function. For the hash chain, the "message" may include the previous block identifier and the payload of a block and the "message digest" may be the block identifier. The cryptographic hash function may use algorithms of: MD5, SHA, RIPEMD-(160), bcrypt, Whirlpool, BLAKE2, etc.

Changing hash chain data within the hash chain may invalidate the hash chain. If the previous block identifier or the payload of a block is changed after a block has been added to the hash chain, the block identifier stored with the block in the hash chain may no longer match a subsequently generated block identifier that is generated using the changed previous block identifier or payload. The difference between the original block identifier and the subsequently generated block identifier indicates that the block has been altered and that the block and the hash chain may be invalid at the block being tested and subsequent blocks.

A lock block of a transaction may be appended to a preceding tail block of a preceding transaction. The previous block identifier of the lock block is set to the preceding tail block, which may be stored by the mitigator program. A lock block that is appended to the hash chain may include, in its payload, data from a write request from a requester program that triggered the creation of the lock block. The data from the write request may include timestamps (date and time) that identify when the write request was generated, sent, and received; an identifier of the requester program; an identifier of the hash chain; an identifier of the transaction being added to the hash chain; etc. Similar data may be included in the payload of an unlock block.

After appending the lock block, a data block is appended. The data block may include, in its payload, transaction data for the transaction being stored in the hash chain by the requester program. For example, the transaction may be a payment transaction that includes an account identifier, a transaction amount, a transaction currency, timestamps for the transaction, a payee identifier, etc. As another example, the transaction may be an item of a grocery list that includes a description of the item, a cost of the item, an image of the item, a user identifier that identifies the user that added an item to the list, etc.

Read access to the transaction and the data block may be denied in response to a read request that does not include a transaction identifier of the transaction. The transaction data from the data block may be transmitted in response to a read request that includes a transaction identifier of the transaction. The transaction identifier may be generated by a mitigator program that received a write request to begin writing the transaction to the hash chain and received the read request with the transaction identifier. The transaction identifier may be shared between cooperating entities (e.g., different client applications) for cooperative updates, reads, etc. Additionally, write access may be denied by the mitigation program in response to write requests that do not include the transaction identifier.

Access to the hash chain may be locked in response to appending the lock block. Locking access may limit write access and transaction read visibility based on the transaction identifier. Locked access may require an identifier of the transaction (also referred to as a transaction identifier) to be included with write requests to write data to the hash chain. Read requests that do not include the identifier of a transaction may still be granted read access to previous transactions that were stored to the hash chain before the current transaction locked the hash chain. Read requests to the current transaction that locked the hash chain may be granted when the identifier of the transaction is included in a request.

Access to the hash chain may be unlocked in response to appending an unlock block of the transaction to the hash chain. After the unlock block is appended, read requests may be granted to the blocks of the hash chain without the requirement of an identifier for a transaction. The first write request received for a new transaction may be granted and a new lock block may be appended to the hash chain.

A transaction identifier may be pushed onto a stack of transaction identifiers when a transaction includes a nested transaction. A nested inner transaction may have lock and unlock blocks between the lock and unlock blocks of an outer transaction. A nested transaction may be created when a lock block is appended to the hash chain before the unlock block of the previous transaction. When the lock block of the nested transaction is appended, instead of setting the tail block identifier to the lock block identifier, the mitigator program may push the lock block identifier onto the top of a tail stack. The tail stack includes tail block identifiers for each level of nesting.

For example, with two levels of nesting, a first transaction includes a first nested transaction and the first nested transaction includes a second nested transaction. After adding the lock block for the second nested transaction, the tail stack will include three tail block identifiers with the lock block of the second nested transaction at the top of the stack and the tail block of the first transaction at the bottom of the stack.

Turning to Step 204, transaction data is removed from the hash chain by setting the tail block identifier to the lock block of the transaction, which effectively removes the data blocks of the transaction that were subsequently appended to the lock block. Alternatively, the tail block identifier may be set to the preceding tail block to fully remove the transaction from the hash chain by removing the transaction data and the lock block of the transaction. The data blocks that are removed may be discarded from memory, which may be performed via garbage collection. Additionally, the entire transaction may be removed and replaced with another transaction.

In Step 206, the transaction is updated by appending updated data blocks to the hash chain. After removing the blocks and transaction data from the hash chain, updated transaction data may be stored in updated data blocks on the hash chain for the transaction. With this improvement to technology, a transaction that is being written to the hash chain may be updated without invalidating the hash chain. For example, a data block of a transaction may include a value (e.g., "7") that is later determined to be incorrect and should be another value (e.g., "8"). The data block with the incorrect value may be removed from the transaction and the transaction may be updated with the correct value by appending an updated data block that includes the correct value.

Turning to FIG. 3, the process (300) stores transactions to hash chains with transactions competing to be the next transaction in the hash chain. Multiple transactions may compete to be the next transaction appended to the hash chain and the first transaction to be completed (e.g., the first transaction for which there are no more data blocks to be added to the transaction or the first transaction to append an unlock block) may be appended to the hash chain. The remaining transactions that did not get appended to the hash chain may be discarded (e.g., garbage collected) or updated to compete to be the next transaction stored in the hash chain.

In Step 302, a data block of a transaction for a first hash chain is appended to a second hash chain. The second hash chain may originate from a tail block of the first hash chain and be one of multiple competing hash chains that are competing to be added as the next transaction to the first hash chain.

A nested transaction may be appended to the second hash chain. The nesting level of hash chains may be tracked with a tail block stack of the mitigator program that mitigates access to the hash chains.

In Step 304, the data block is removed from the transaction without invalidating the first hash chain. The data block may be removed by setting a tail block identifier of the second hash chain to a previous block that was appended to the first hash chain or the second hash chain prior to the data block being appended to the second hash chain. To remove the transaction and its data blocks, the tail block identifier may be set to the tail block of the first hash chain. To remove part of a transaction and some of the data blocks of the transaction, the block identifier may be set to a previous data of block of the transaction that is in the second chain and that was added to the second chain prior to when the data of block that is being removed was added to the second chain. The data blocks that are removed may be discarded from memory, which may be performed via garbage collection.

In Step 306, the transaction is updated with updated transaction data. The transaction may be updated by appending an updated data block to the second hash chain after removing a data block that was previously added. Appending the updated data block may include setting the tail block identifier of the second hash chain to the updated data block. With this improvement to technology, a transaction that is to be written to the first hash chain may be updated without invalidating the first hash chain or the second hash chain.

In Step 308, the second hash chain is appended to the first hash chain. The second hash chain may be appended to the first hash chain by setting the tail block of the first hash chain to the tail block of the second hash chain.

The second hash chain may include a lock block, an unlock block, or both a lock block and an unlock block. A lock block may be appended to the second hash chain before appending a data block to the second hash chain. A data block may then be appended to the lock block.

An unlock block may be appended to the second hash chain before appending the second hash chain to the first hash chain. Appending the second hash chain with an unlock block to the first hash chain may include setting the unlock block of the second hash chain as the tail block of the first hash chain.

After the second hash chain is appended to the first hash chain, other competing transactions that were competing with the transaction of the second hash chain may be removed or updated since the blocks of the competing transactions are no longer valid due to the change of the tail block of the first hash chain. By updating the block identifiers and previous block identifiers of a competing transaction, a competing transaction may continue to compete to be the next transaction that is appended.

For example, a third hash chain of a competing transaction may update the block identifiers and previous block identifiers of the third hash chain in response to the second hash chain being appended to the first hash chain. Updating the block identifiers and previous block identifiers of the third hash chain may include setting the initial previous block identifier of an initial block of the third hash chain to the tail block of the second hash chain (which was set as the current tail block of the first hash chain) and recalculating the block identifier for the initial block. These steps of updating the previous block identifier and recalculating the block identifier may be repeated for the blocks in the third hash chain. After the previous block identifiers are updated and the block identifier are recalculated, the third hash chain may be appended to the first hash chain as the next transaction.

When multiple transactions are competing to be the next transaction added to the hash chain, the mitigator program may maintain a list of the competing transactions. The list of competing transactions may include a list of tail block identifiers that identify the tail blocks of the competing transactions.

Figure 4A:
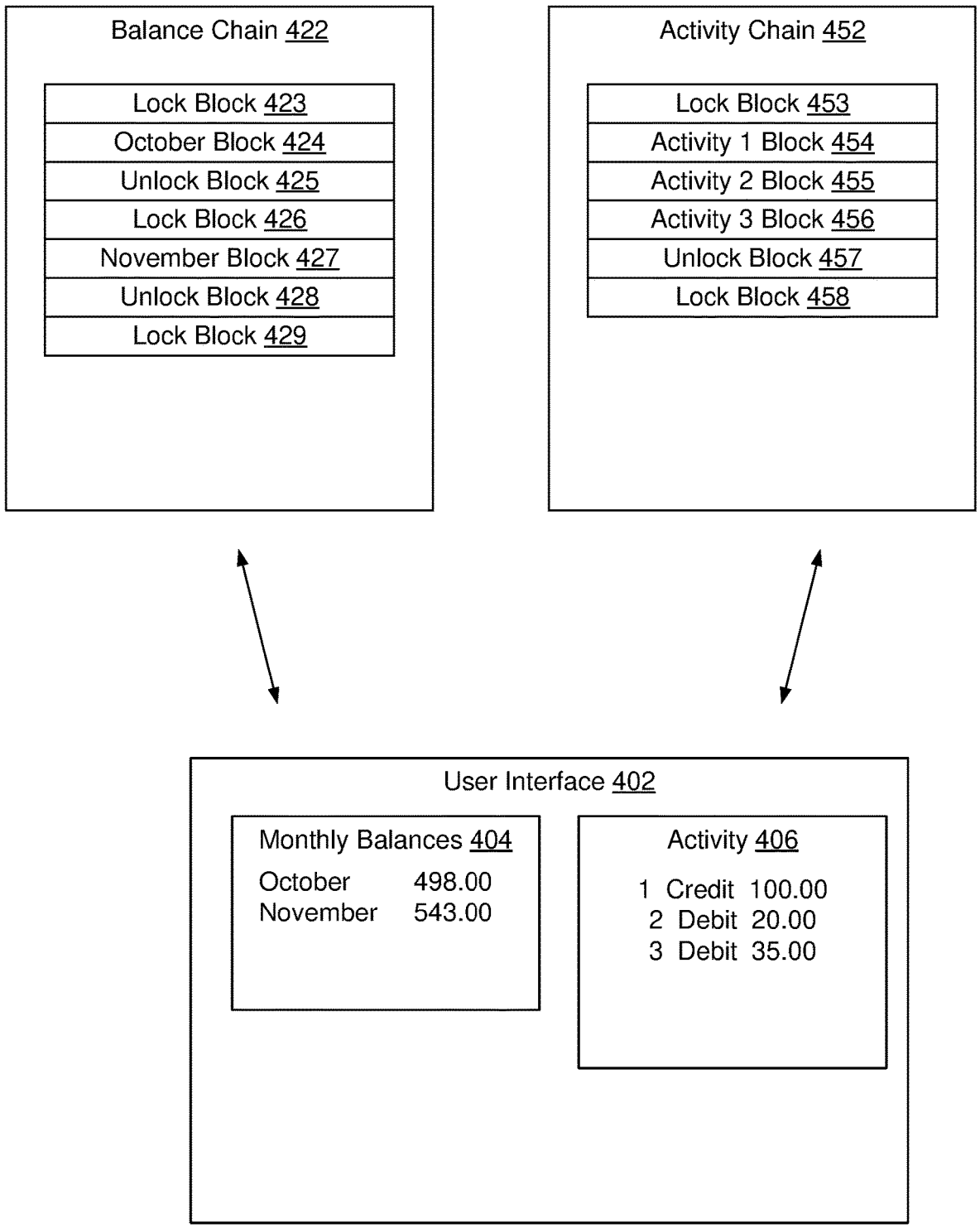
FIG. 4A, FIG. 4B, and FIG. 4C show examples in accordance with disclosed embodiments.
Figure 4B:
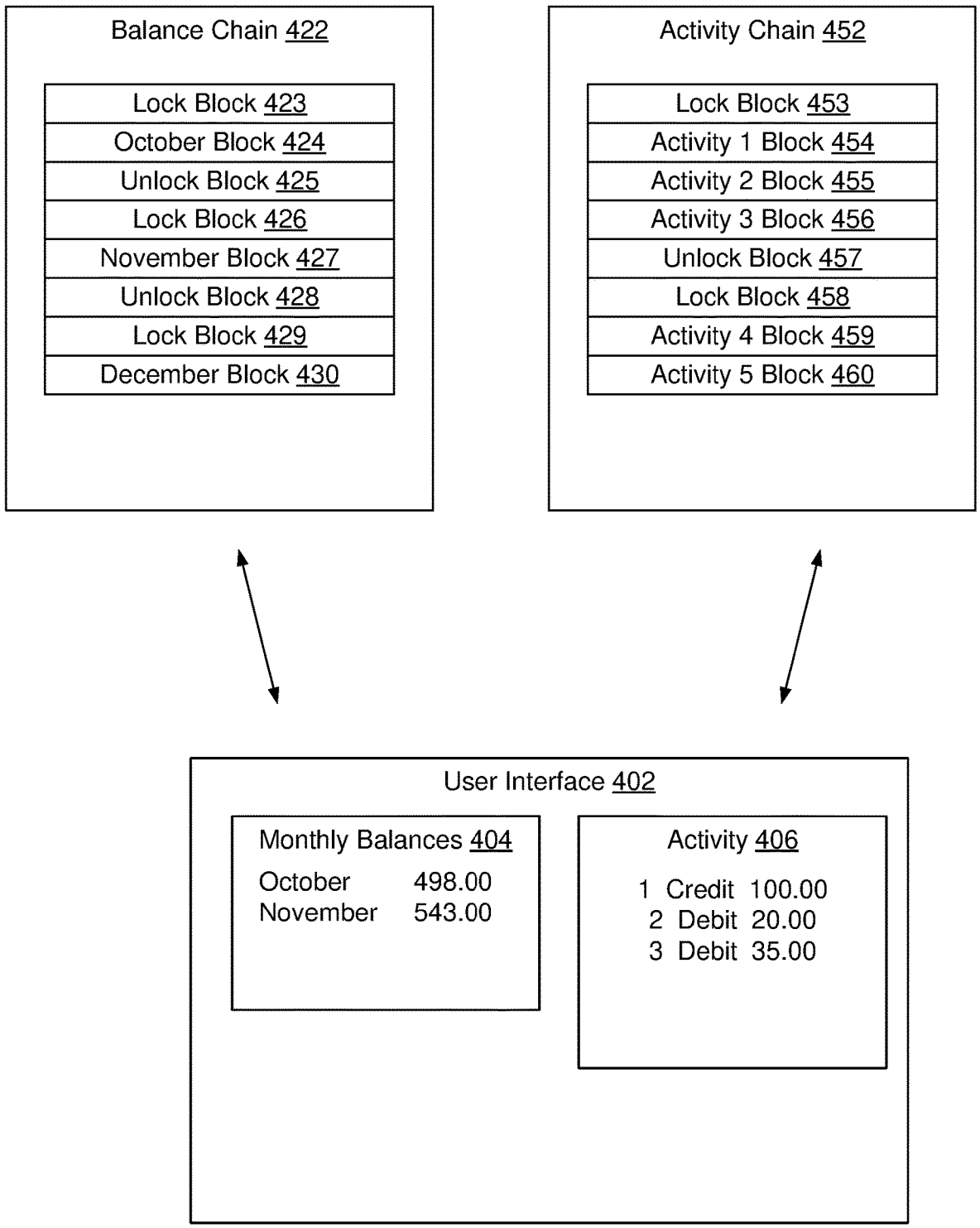
Figure 4C:
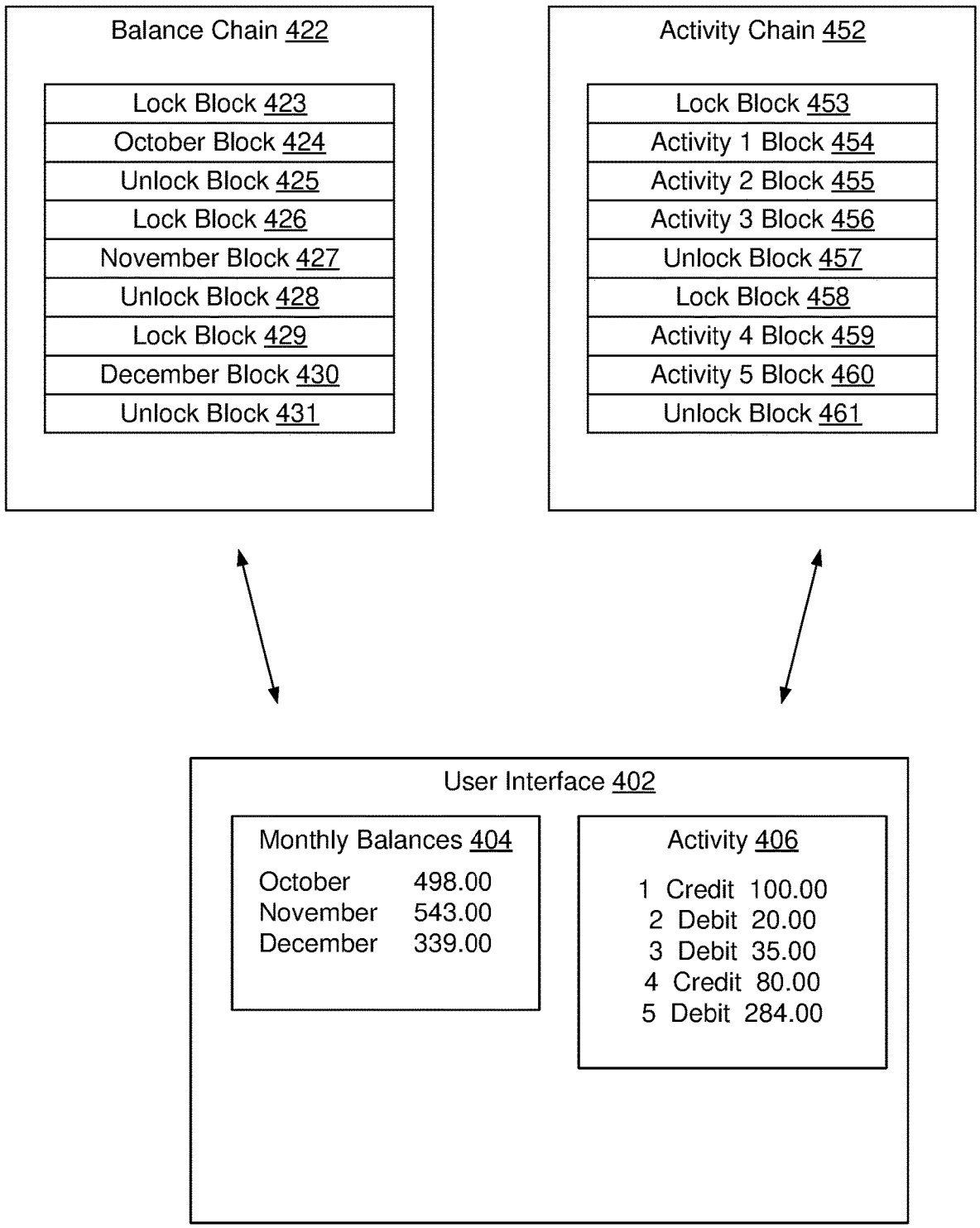

FIG. 4A, FIG. 4B, and FIG. 4C show examples of systems and interfaces in accordance with the disclosure. The embodiments of FIGS. 4A, 4B, and 4C may be combined and may include or be included within the features and embodiments described in the other figures of the application. The features and elements of FIGS. 4A, 4B, and 4C are, individually and as a combination, improvements to the technology of hash chain computing systems. The various features, elements, widgets, components, and interfaces shown in FIG. 4A, FIG. 4B, and FIG. 4C may be omitted, repeated, combined, and/or altered as shown. Accordingly, the scope of the present disclosure should not be considered limited to the specific arrangements shown in FIG. 4A, FIG. 4B, and FIG. 4C.

Turning to FIG. 4A, the user interface (402) is a graphical user interface that may be displayed on a client device. The user interface (402) includes the balances view (404) and the activity view (406).

The balances view (404) is a view of the user interface (402). The balances view (404) presents monthly balance information by displaying the data from the blocks of the balance chain (422). The data from the blocks of the balance chain (422) may be retrieved from a repository by a requester program that requests the data from the balance chain (422) through a mitigator program. In FIG. 4A, the balances view (404) displays the balances for the months of October and November, which are retrieved from the October block (424) and the November block (427), respectively.

The balance chain (422) is a hash chain stored in a repository. The balance chain (422) includes a first transaction that includes the blocks (423) through (425) and a second transaction that includes the blocks (426) through (428). A third transaction has been started with the lock block (429) but has not been completed.

The activity view (406) is a view of the user interface (402). The activity view (406) presents activity information by displaying the data from the blocks of the activity chain (452). The data from the blocks of the activity chain (452) may be retrieved using requester and mitigator programs hosted by a cloud server with access to a repository that stores the activity chain (452). In FIG. 4A, the activity view (406) displays the credit and debits from activity blocks (454) through (456).

The activity chain (452) is another hash chain that may be stored in the same repository as the balance chain (422). The activity chain (452) includes a first transaction with the blocks (453) through (457). The activity chain (452) includes the beginnings of a second transaction with the lock block (458).

Turning to FIG. 4B, the balance chain (422) and the activity chain (452) are updated to include data blocks of transactions, but the views (404) and (406) in the user interface (402) of the chains (422) and (452) are not updated. The balance chain (422) is updated to include the December block (430), which includes the December monthly balance for an account. The activity chain (452) is updated to include the data blocks (459) and (460) for activities on the account, which are not displayed in the view (406) in FIG. 4B.

Turning to FIG. 4C, the unlock blocks (431) and (461) are respectively appended to the balance chain (422) and the activity chain (452). In response to appending the unlock blocks (431) and (461), the balances view (404) and the activity view (406) are updated in the user interface (402) to display the December monthly balance and to display the credit and debit activities on the account.

In the sequence of FIGS. 4A through 4C, a first hash chain, the balance chain (422), is locked with the block (429) to prevent access to the account balance chain (422) while the account balance chain (422) is updated. A second hash chain, the activity chain (452), is locked with the block (458) to prevent access to the activity chain (452) while the activity chain (452) is updated. Data for an account balance chain transaction in the block (430) is appended to the account balance chain (422) with the block (430). Data for an account activity chain transaction, comprising the blocks (459) through (460), are appended to the account activity chain (452). The account activity chain transaction corresponds to the account balance chain transaction. The account balance chain and the account activity chain are then respectively unlocked with the unlock blocks (431) and (461). The account balance chain (422) and the account activity chain (452) are then presented with the newly appended transactions in the views (404) and (406) of the user interface (402).

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a computer processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) may also be a virtual machine. The virtual machine may be hosted on a physical computer system by a cloud services provider.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   appending a data block of a transaction of a first hash chain to a second hash chain, the second hash chain originating from a tail block of the first hash chain;
   retrieving a first tail block identifier of the first hash chain and a second tail block identifier of the second hash chain, wherein the first tail block identifier and the second tail block identifier are stored in a tail stack that is separate from the first hash chain and the second hash chain;
   removing the data block from the transaction without invalidating the first hash chain by setting the second tail block identifier of the second hash chain to a previous block appended to one of the first hash chain and the second hash chain prior to the data block;
   updating the transaction with updated transaction data by appending an updated data block to the second hash chain after removing the data block, wherein appending the updated data block comprises setting the second tail block identifier of the second hash chain to the updated data block; and
   appending the second hash chain to the first hash chain by setting the first tail block identifier of the first hash chain to a tail block of the second hash chain.

2. The method of claim 1, further comprising:
   appending a lock block to the second hash chain before appending the data block,
   wherein appending the data block comprises appending the data block to the lock block prior to removing the data block.

3. The method of claim 1, further comprising:
   appending an unlock block to the second hash chain before appending the second hash chain to the first hash chain,
   wherein appending the second hash chain to the first hash chain comprises setting the unlock block as the tail block of the first hash chain.

4. The method of claim 1, further comprising:
   appending a nested transaction to the second hash chain before appending the second hash chain to the first hash chain.

5. The method of claim 1, further comprising:
   updating block identifiers and previous block identifiers of a third hash chain of a competing transaction in response to the second hash chain being appended to the first hash chain; and
   appending the third hash chain to the first hash chain.

6. The method of claim 1, further comprising:
   locking the first hash chain, the first hash chain being an account balance chain, to prevent access to the account balance chain while the account balance chain is updated;
   locking an account activity chain to prevent access to the account activity chain while the account activity chain is updated; and
   appending the transaction as an account balance chain transaction to the account balance chain and appending an account activity chain transaction to the account activity chain, the account activity chain transaction corresponding to the account balance chain transaction.

7. The method of claim 6, further comprising:
   unlocking the account balance chain and the account activity chain; and
   presenting the account balance chain and the account activity chain updated with the account balance chain transaction and the account activity chain transaction.

8. A system comprising:
a computer processor;
a memory coupled to the computer processor;
the memory comprising an application, which, when executed by the computer processor, performs operations comprising:
appending a data block of a transaction of a first hash chain to a second hash chain, the second hash chain originating from a tail block of the first hash chain;
retrieving a first tail block identifier of the first hash chain and a second tail block identifier of the second hash chain, wherein the first tail block identifier and the second tail block identifier are stored in a tail stack that is separate from the first hash chain and the second hash chain;
removing the data block from the transaction without invalidating the first hash chain by setting the second tail block identifier of the second hash chain to a previous block appended to one of the first hash chain and the second hash chain prior to the data block;
updating the transaction with updated transaction data by appending an updated data block to the second hash chain after removing the data block, wherein appending the updated data block comprises setting the second tail block identifier of the second hash chain to the updated data block; and
appending the second hash chain to the first hash chain by setting the first tail block identifier of the first hash chain to a tail block of the second hash chain.

9. The system of claim 8, wherein the operations further comprise:
appending a lock block to the second hash chain before appending the data block,
wherein appending the data block comprises appending the data block to the lock block prior to removing the data block.

10. The system of claim 8, wherein the operations further comprise:
appending an unlock block to the second hash chain before appending the second hash chain to the first hash chain,
wherein appending the second hash chain to the first hash chain comprises setting the unlock block as the tail block of the first hash chain.

11. The system of claim 8, wherein the operations further comprise:
appending a nested transaction to the second hash chain before appending the second hash chain to the first hash chain.

12. The system of claim 8, wherein the operations further comprise:
updating block identifiers and previous block identifiers of a third hash chain of a competing transaction in response to the second hash chain being appended to the first hash chain; and
appending the third hash chain to the first hash chain.

13. The system of claim 8, wherein the operations further comprise:
locking the first hash chain, the first hash chain being an account balance chain, to prevent access to the account balance chain while the account balance chain is updated;
locking an account activity chain to prevent access to the account activity chain while the account activity chain is updated; and
appending the transaction as an account balance chain transaction to the account balance chain and appending an account activity chain transaction to the account activity chain, the account activity chain transaction corresponding to the account balance chain transaction.

14. The system of claim 13, wherein the operations further comprise:
unlocking the account balance chain and the account activity chain; and
presenting the account balance chain and the account activity chain updated with the account balance chain transaction and the account activity chain transaction.

15. A non-transitory computer readable medium comprising computer readable program code, which, when executed by a computer processor, performs functions comprising:
appending a data block of a transaction of a first hash chain to a second hash chain, the second hash chain originating from a tail block of the first hash chain;
retrieving a first tail block identifier of the first hash chain and a second tail block identifier of the second hash chain, wherein the first tail block identifier and the second tail block identifier are stored in a tail stack that is separate from the first hash chain and the second hash chain;
removing the data block from the transaction without invalidating the first hash chain by setting the second tail block identifier of the second hash chain to a previous block appended to one of the first hash chain and the second hash chain prior to the data block;
updating the transaction with updated transaction data by appending an updated data block to the second hash chain after removing the data block, wherein appending the updated data block comprises setting the second tail block identifier of the second hash chain to the updated data block; and
appending the second hash chain to the first hash chain by setting the first tail block identifier of the first hash chain to a tail block of the second hash chain.

16. The non-transitory computer readable medium of claim 15, wherein the functions further comprise:
appending a lock block to the second hash chain before appending the data block,
wherein appending the data block comprises appending the data block to the lock block prior to removing the data block.

17. The non-transitory computer readable medium of claim 15, wherein the functions further comprise:
appending an unlock block to the second hash chain before appending the second hash chain to the first hash chain; and
wherein appending the second hash chain to the first hash chain comprises setting the unlock block as the tail block of the first hash chain.

18. The non-transitory computer readable medium of claim 15, wherein the functions further comprise:
appending a nested transaction to the second hash chain before appending the second hash chain to the first hash chain.

19. The non-transitory computer readable medium of claim 15, wherein the functions further comprise:
updating block identifiers and previous block identifiers of a third hash chain of a competing transaction in response to the second hash chain being appended to the first hash chain; and
appending the third hash chain to the first hash chain.

20. The non-transitory computer readable medium of claim 15, wherein the functions further comprise:

locking the first hash chain, the first hash chain being an account balance chain, to prevent access to the account balance chain while the account balance chain is updated;

locking an account activity chain to prevent access to the account activity chain while the account activity chain is updated;

appending the transaction as an account balance chain transaction to the account balance chain and appending an account activity chain transaction to the account activity chain, the account activity chain transaction corresponding to the account balance chain transaction;

unlocking the account balance chain and the account activity chain; and presenting the account balance chain and the account activity chain updated with the account balance chain transaction and the account activity chain transaction.

\* \* \* \* \*